United States Patent Office 3,310,529
Patented Mar. 21, 1967

3,310,529
PROCESS OF HARDENING EPOXIDE RESIN AND PRODUCT PRODUCED
Markus Marti, Zurich, and Manfred Hoppe, Chur, Grisons, Switzerland, assignors to Inventa A.-G. für Forschung und Patentverwertung, Lucerne, Switzerland
No Drawing. Filed Nov. 7, 1963, Ser. No. 322,012
Claims priority, application Switzerland, Nov. 7, 1962, 13,034/62
2 Claims. (Cl. 260—47)

The present invention relates to a process for hardening epoxide resins, containing more than one epoxide group per molecule, into insoluble and non-meltable products, through the use of condensation reaction products of biuret and aliphatic polyamines as hardening agents.

Hardenable epoxide resins are usually obtained by the transformation of epihalogen hydrin with a polyvalent phenol or a polyvalent alcohol in the presence of alkalis. At room temperature these resins may be in solid or liquid form and contain more than one epoxide group in the molecule.

During hardening, these molecules are cross-linked with the assistance of a hardening agent. Depending on the type of hardening agent, this cross-linking takes place either in the cold, i.e. at room temperature, or the resin-hardening-agent-mixture has to be heated.

Most suitable as hardening agents are acid or basic organic compounds containing groups in the molecule which are able to react with epoxide groups. For hardening in warm temperatures, it is preferable to use polycarboxylic acid, its anhydrides, or aromatic polyamines, and for hardening in cold temperatures, aliphatic and aromatic amines or polyamines which contain primary or secondary amino groups. Many of the known amines or polyamines which contain at least 3 hydrogen atoms bonded to nitrogen, however, are relatively low-boiling compounds with high steam pressure and therefore present difficulties in the processing, particularly in view of their toxic qualities. Furthermore, the castings thus produced are very brittle and, consequently, their application is limited. Known polyaminoamido compounds, obtained through reaction of dimeric, unsaturated fatty acids with polyamines (see for instance U.S. Patent No. 2,706,223), are considerably less toxic, but have a relatively high viscosity as a result of which they are difficult to handle.

The resins produced with the help of such polyaminoamido compounds, as for example, as castings, are less brittle, but on the other hand, they also do not retain their shape as well in heat; this limits the application possibilities of these hardening agents.

It has already been suggested, for the purposes of improving the mechanical properties of epoxide resins, hardened with aliphatic polyamines, to use certain flexibilizers or plasticizers, such as for instance esters of aliphatic alcohols with aromatic acids, such as for instance dibutylphthalate (see DRP No. 749,512), polyethylene glycols, etc., but this too only results in products with little ability to retain their shape in warm temperature. Furthermore, such products, flexibilized by softening additives, tend to show signs of aging.

The present invention relates to a hardening process, which is free of the disadvantages described, and which, in addition, offers further advantages. The discovery made was, that epoxide resins, containing more than one epoxide group in the molecule, could be hardened with basic hardening agents, if the epoxide resins are mixed with a condensation product of 1 mol biuret with at least 2 mols of polyamine.

The condensation products from biuret and aromatic polyamines, such as for instance, phenylene diamine, are solid and are admixed with the epoxide resin preferably in liquid form. Suitable solvents are organic solvents such as ester, ketones or alcohols. The addition of dissolved hardening agents is common in lacquering (painting), coating, overlaying or impregnating. Condensation products of biuret and aliphatic polyamines such as diethylene triamine and triethylene tetramine are liquid and can be directly mixed with liquid epoxide resins. Naturally, also solid resins can be dissolved and this solution can be mixed with the liquid hardening agents and used for the above-mentioned purposes. The epoxide resins hardened with the help of biuret-polyamine condensation products are at least equal to resins hardened with the known polyaminoamides, as regards solidity and resistance against solvents, and as regards retention of shape in warm temperature, they are clearly superior. In the hardening process according to the invention, there is no need for special addition of flexibilizing agents, as a result of which no softener is sweated out during aging and the mechanical properties remain unchanged.

Another advantage of the condensation products used according to the invention consists in the fact that the hardening can be executed in two stages, which is of particular importance if liquid resins are used. If liquid biuret-polyamine condensates, for instance one of biuret and diethylene triamine, are mixed with epoxide resins which are liquid at room temperature and are spread in a thin layer, for instance onto a polyethylene foil, from which the heat released during hardening can be eliminated, so that the exthermal heat would not in itself produce hardening, products are obtained which are solid and already partly cross-linked. The latter products harden completely only in warm temperature, and become liquid once more with very good flow quality when heated before their final hardening. In partly cross-linked hardened condition before being finally heat-hardened, these products can be ground to a fine-grained powder, which flows freely and does not tend to stick. If such a powder is applied to a heated area, it melts before hardening into a non-meltable cover, to form an even surface. This behavior makes the condensation product according to the invention particularly suitable, if mixed with epoxide resins, for the manufacture of coatings according to the "whirlpool" (Wirbelbett) and flame spraying process, as well as for the production of plastic material and prepegs, i.e. substrata of glass wool, textiles, etc. impregnated with not yet completely hardened resin-hardening mixture.

The pre-hardened resins can also be produced on other substrata such as paper, wood, fillers, such as sand, metal powder or sawdust, etc. and after shaping of the semifinished products thus obtained, they can first be liquified by heating and then finally hardened. The hardening process according to the invention furthermore makes possible the use of epoxide resins for heat seal pasting. For that purpose, a meltable, pre-hardened product of epoxide resins and biuret-polyamine condensates is produced on a flat base, and this base during the final hardening of the resin following the initial liquefaction of the pre-hardened resin during heating, is glued to another base, possibly impregnated in the same way with pre-hardened resin, by placing it over or pressing it against it. Heat sealable foils, which are easy to handle, can be cut to any size and can be made sticky on both sides for the gluing of glass, metal, porcelain, cement, synethetic materials and the like among each other or with one another, by immersing metal or plastic foils, textiles, nets, glass fibres or the like in the liquid epoxide-resin-hardening-mixture and after the excess resin has drained off, by pre-hardening the resin during several hours at room temperature or for a short time at slightly higher temperature. Heat sealable foils thus produced with a metal base, are also suitable for the gluing of material which has not been heated to the hardening temperature of the resin or of material the dimensions of which makes the hardening in a stove impossible, by heating the conductor metal base with the help of conducting electricity through it. Metal pieces of any size can also be glued in that manner, since the resin layer on both sides of the gluing foil acts as an insulator for electricity. Suitable as organic solders for glass, porcelain, stone, cement, metal, wood, etc., and applicable with a soldering bit covered with a form-parting agent, are mixtures of powders of solid epoxide resins and powders of solid biuret-polyamine condensates, ground or pre-hardened, in thin bars or strips, and mixtures of liquid resins and liquid biuret-polyamine condensation products. These solders become liquid for a brief period when heated and then harden very quickly.

The products, which are obtained by the mixing of epoxide resins with biuret-polyamine-condensates at room temperature or at slightly higher temperatures and which are pre-hardened and still meltable, are durable for many months and harden up by themselves only very slowly. The rate of the independent hardening or the hardening caused by heating is dependent upon the number of amines of the biuret-polyamine condensate used. The number of amines is defined by the number of milligram of caustic potash solution which corresponds to the amount of hydrochloric acid necessary for the neutralization of the free amino group of one gram of substance. The biuret-polyamine condensates may be stored for any length of time without decomposition or change of characteristics.

The production of the condensation products used for the process of hardening according to the present invention is achieved by heating 1 mol of biuret with at least 2 mols of a polyamine, preferably with 1 to 4 mols, to 100–300° C., preferably to 130–200° C., and removing the ammonia developed during the reaction. Under the temperatures described above, the reaction is complete within about two hours and now only excess polyamine which may be present, is removed by distillation. The production of the condensation product according to the invention may take place on a continuous or discontinuous basis. If aliphatic polyamines are used, the condensation products are liquids of a slightly yellow color which can be easily mixed with liquid epoxide resins; if aromatic polyamines, such as for instance phenylene diamine, are used, dark, solid, condensates are obtained.

By changing the mol ratio of the initial products, it is possible to adjust the amine number of the condensation product, as desired. If one works with a considerable excess of polyamines, such as for instance, 4 mols of polyamine per mol of biuret, any number of amines with amine numbers over 400 may be obtained in the condensation product by incomplete separation of the amine excess. If all excess amine is separated, a condensation product with an amine number of 400 mg. KOH/g. substance is obtained. One may also use the approach of choosing the amounts of the initial products in such manner that one can immediately arrive at a condensation product with the desired amine number, without having to discharge excess amine. During the condensation of 1 mol of biuret with at least 2 mols of polyamine, 2 mols of ammonia are split off and the end of the reaction can be determined from the amount of ammonia.

The most suitable mixture ratio between the hardenable epoxide resin and the biuret-polyamine condensate, used as a hardener, according to the invention, may be determined by preliminary examinations. It is of course dependent on the type of resin and on the type of polyamine, used for the production of the hardener, and the purpose of the hardener, i.e. whether eventually it will be used as pouring resin, as lacquer resin, as glue or for coatings, etc. and also on the number of amines. The proportions of resin and hardener do not fluctuate greatly. Basically, between 15 and 50 g. of hardener for 100 g. of resin should achieve hardening for all materials and purposes.

*Example 1*

In a 3 liter three-necked flask, equipped with a thermometer, a gas inlet tube and a reflux condenser, 515 g. of biuret (5 mols) and 2060 g. of diethylene triamine (20 mols) are heated under a light nitrogen flow. At 128° C., splitting off of ammonia starts and the temperature is increased to 200° C. within two hours. After that, no more ammonia is split off and the reaction is completed. Excess diethylene triamine is discharged under a vacuum of 30 torrs (30 mm. Hg) up to a sump temperature of 160° C. and as residue, 1455 g. of a clear, light, slightly yellow condensation product are obtained, which product has a viscosity of 176.5 cp. (absolute) at 25° C. and an amine number of 501.

30 g. of this condensation product are mixed with 100 g. of epoxide resin having more than one 1,2-epoxide groups produced by mixing p,p'-dihydroxy-diphenylmethane and epichlorohydrin thoroughly at room temperature in the presence of alkali and having an epoxide number of 0.52 per 100 g., and pouring the mixture of condensation product and epoxide resin into molds. After a hardening period of 4 hours at 120° C., the impact bend according to DIN 53,453 and the stability of shape in warm temperature according to Martens, were measured with test rods of 120 x 15 x 10 mm.

Impact bend _____ 36.8 cm. kg./cm.$^2$.
Martens point _____ 72° C.

*Example 2*

In the apparatus, described under Example 1, 103 g. of biuret (1 mol) are heated with 206 g. of diethylene triamine under a light nitrogen flow. At 130° C. splitting off of ammonia starts which is completed after two hours at 200° C. From the residue, no diethylene triamine can be separated by distillation. 262 g. of a light, slightly yellow, clear, condensation product are obtained, which product has a viscosity of 834 cp. (absolute) at 25° C. and an amine number of 406.

35 g. of this condensation product are thoroughly mixed with 100 g. of the epoxide resin, described in Example 1 and hardened at room temperature on a polyethylene foil in a layer of about 2 mm. After 24 hours, the solid product of the reaction was ground up in a ball mill and a freely flowing and non-sticky powder was obtained, which melts well between 90 and 160° C. and spreads evenly and only after that turns hard. The pre-hardened product had been stored at room temperature for three months without any changes before it was finally hardened.

*Example 3*

In the apparatus, described under Example 1, 103 g. of biuret (1 mol) are heated with 228 g. of diethylene triamine (2 mols, 22g.) for two hours up to 200° C. After splitting off of 2 mols of ammonia, the reaction was complete and there resulted a clear, light condensation product with an amine number of 468 g. The viscosity at 25° C. was 306 cp. (absolute). After mixing of 100 g. of the epoxide resin, described in Example 1, with 30 g. of this condensation product and letting it stand for five hours at room temperature on a polyethylene plate with a layer of about 5 mm., a pre-hardened, still meltable resin is obtained. It is suitable for the production of molding powder, "whirlpool" (Wirbelbett) or flame spraying powder, as glue, for overlaying, as organic solder agent, etc. and can be finely hardened by about 4–6 hours heating at 100–120° C. or through brief liquefaction.

Whas is claimed is:

1. A process for hardening an epoxide resin containing more than one 1,2-epoxide groups per molecule, which comprises mixing with said resin as a hardening agent an effective amount of a condensation reaction product produced by reacting at a temperature between 100 to 300° C., 1 mol of biuret with at least 2 mols of a polyamine of the class consisting of phenylene diamine, diethylene triamine and triethylenetetramine.

2. A composition comprising an epoxide resin containing more than one 1,2-epoxide groups per molecule and an effective amount of a hardening agent for said resin comprising a condensation reaction product produced by reacting at a temperature between 100 and 300° C., 1 mol of biuret with at least 2 mols of a polyamine of the class consisting of phenylene diamine, diethylene triamine and triethylenetetramine.

References Cited by the Examiner

UNITED STATES PATENTS

| 2,801,229 | 7/1957 | De Hoff et al. | 260—47 |
| 2,876,260 | 3/1959 | Huyser et al. | 260—47 |

WILLIAM H. SHORT, *Primary Examiner.*

T. D. KERWIN, *Examiner.*